June 15, 1965 W. D. PRICER 3,189,878
NEGATIVE RESISTANCE MEMORY CIRCUIT
Filed July 11, 1962 2 Sheets-Sheet 1

INVENTOR
WILBUR DAVID PRICER
BY John F. Ostendorf
ATTORNEY

United States Patent Office
3,189,878
Patented June 15, 1965

3,189,878

NEGATIVE RESISTANCE MEMORY CIRCUIT

Wilbur D. Pricer, Wappingers Falls, N.Y., assignor to International Business Machines Corporation, New York, N.Y., a corporation of New York Filed July 11, 1962, Ser. No. 209,163
10 Claims. (Cl. 340—173)

This invention relates to information storage circuits for use in a memory matrix and, more particularly, to a memory circuit capable of storing a plurality of bits of information or individual bits from a number of words of information.

Conventional matrical memories employing bistable devices, such as tunnel diodes or ferrite cores, for information storage are capable of storing only one bit of information for each device employed in the matrix. As a result, a number of storage devices are required to store a word of information. In addition, independent access or selection driver circuits are often required for each word of information that is stored. Consequently, in order to increase the information storage capabilities in modern digital computers, such memories have become extremely cumbersome requiring large numbers of storage devices and control circuits.

Accordingly, it is a primary object of the invention to provide an improved matrical memory requiring fewer storage devices and control circuits in order to store an amount of information equivalent to that stored in a conventional memory.

It is another object of the invention to provide a memory cell capable of storing a plurality of bits of information or individual bits from a plurality of words of information.

A further object of the invention is to provide a matrical memory array requiring a single information addressing and sensing circuit for an entire array.

In accordance with an aspect of the invention, there is provided a matrical memory having an $m$ number of X lines and an $n$ number of Y lines intersecting to form an $mn$ number of crosspoints having a memory cell located at each crosspoint. Each memory cell comprises a negative resistance device having delay media connected across it and normally biased through the delay media by a voltage source for operation in an oscillatory mode to produce pulsations. A first driver circuit is connected to one terminal of the device through a unidirectional conducting device and a second driver circuit is directly coupled to the opposite terminal of the negative resistance device. When supplied with appropriate driver signals, the pulsations are controlled enabling each cell to store a plurality of bits of coded information limited in number only by the inherent switching characteristics of the negative resistance device and the response of the delay media.

A feature of the invention is the provision of a memory cell employing a negative resistance device, such as a tunnel diode, which is normally biased for oscillatory action in its negative resistance region and which operates in conjunction with delay media connected across it for storing a plurality of bits of information.

It is another feature of the invention to provide a two-dimensional matrical memory having a memory cell located at each crosspoint of the matrix for storing a plurality of bits of coded information.

A further feature of the invention provides for a matrical memory capable of storing an individual word of information at each crosspoint of the matrix to require one driver circuit for each drive line of the matrix, and, therefore, for a number of words of information.

The foregoing and other objects, features and advantages of the invention will be apparent from the following more particular description of a preferred embodiment of the invention, as illustrated in the accompanying drawing, wherein.

Figure 1:
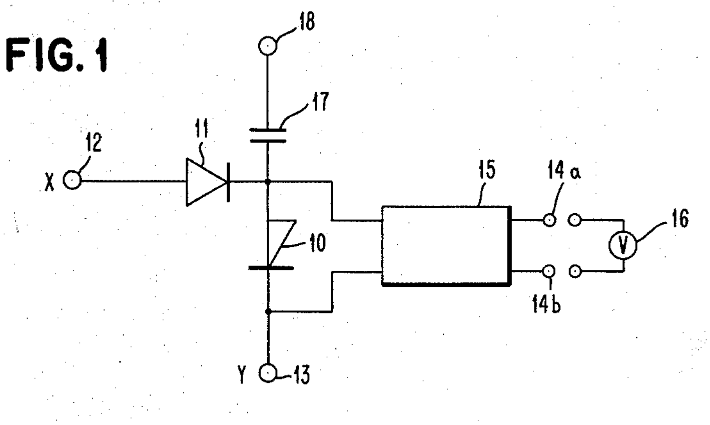
FIGURE 1 is a circuit diagram of a memory circuit in accordance with the principles of the invention.

Referring now to FIGURE 1, the novel memory circuit comprises a negative resistance device 10 which is preferably a tunnel diode. The anode of tunnel diode 10 is connected through a conventional semiconductor diode 11 to an access terminal 12 for connection to a source of X driver signals (not shown), and through a capacitor 17 to a bit rate clock (not shown) at a terminal 18. The cathode of tunnel diode 10 is directly connected to an access terminal 13 for connection to a source of Y driver signals (not shown). A delay line 15 is connected across tunnel diode 10 and to a voltage source 16 at the terminals 14*a*, 14*b*. Voltage source 16 provides the D.C. biasing for tunnel diode 10 during operation of the circuit and is effectively a resistive-capacitive circuit presenting a short circuit (zero impedance) to A.C. signals so that delay line 15 is short circuited at this end.

Figure 3:
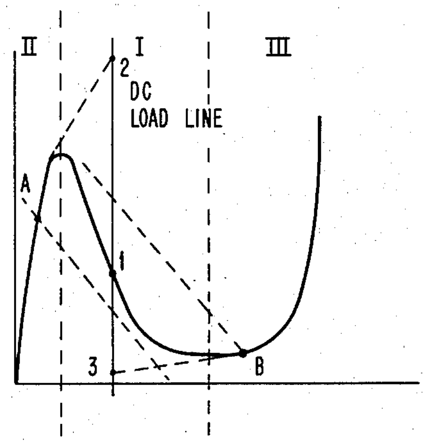
FIGURE 3 is a waveform diagram showing the operating volt-ampere characteristic of the tunnel diode employed in the circuit of FIGURE 1.

As shown in FIGURE 3, the tunnel diode has a volt-ampere characteristic with a negative resistance region I bounded by two positive resistive regions II and III. When biased into a D.C. operating condition by the voltage source 16, a load line such as that indicated in FIGURE 3 intersects the volt-ampere characteristic of tunnel diode 10 at the point 1 in the region I. This is an unstable operating point for the tunnel diode acting as a focus, so that oscillation takes place about it between the points 2 and 3. The points 2 and 3 are imaginary stable operating points and are located at the intersection of the D.C. load line for the tunnel diode 10 and the broken line extensions of the positive resistance portions of the diode characteristic.

When biased in such a manner, the tunnel diode provides a series of pulsations (refer to FIGURE 2) which are arbitrary in character and which are positive and negative voltage excursions about a quiescent level of operation. This aspect of operation of a negative resistance device is described with greater particularity on page 112 et seq. in the textbook "Nonlinear Analysis," by W. J. Cunningham. An operating characteristic curve for a negative resistance device, such as the tunnel diode employed in the circuit of the invention, is depicted on page 113 of this text.

Figure 2:
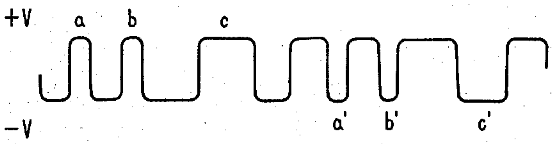
FIGURE 2 is a waveform diagram of pulsations produced by the circuit of FIGURE 1.

Referring again to FIGURE 2, as long as the tunnel diode 10 is biased in this manner and does not receive any external excitation, it operates in an oscillatory mode to produce pulsations. The pulsations appear at the anode of the tunnel diode and are transmitted through the delay line 15 to the voltage source 16. As already indicated, voltage source 16 effectively presents a short circuit to the pulsations, inverting them and transmitting them back to the tunnel diode with the opposite polarity. Consequently, if pulsations having a positive polarity, such as those indicated as *a*, *b* and *c* of FIGURE 2, are provided by the tunnel diode 10, they travel through the delay line; source 16 inverts them and they are transmitted back through the delay line as the pulses of negative polarity $a'$, $b'$ and $c'$. Tunnel diode 10 reinverts the pulsations and this action is repeated until external excitation is applied to the circuit.

Figures 4, 5:
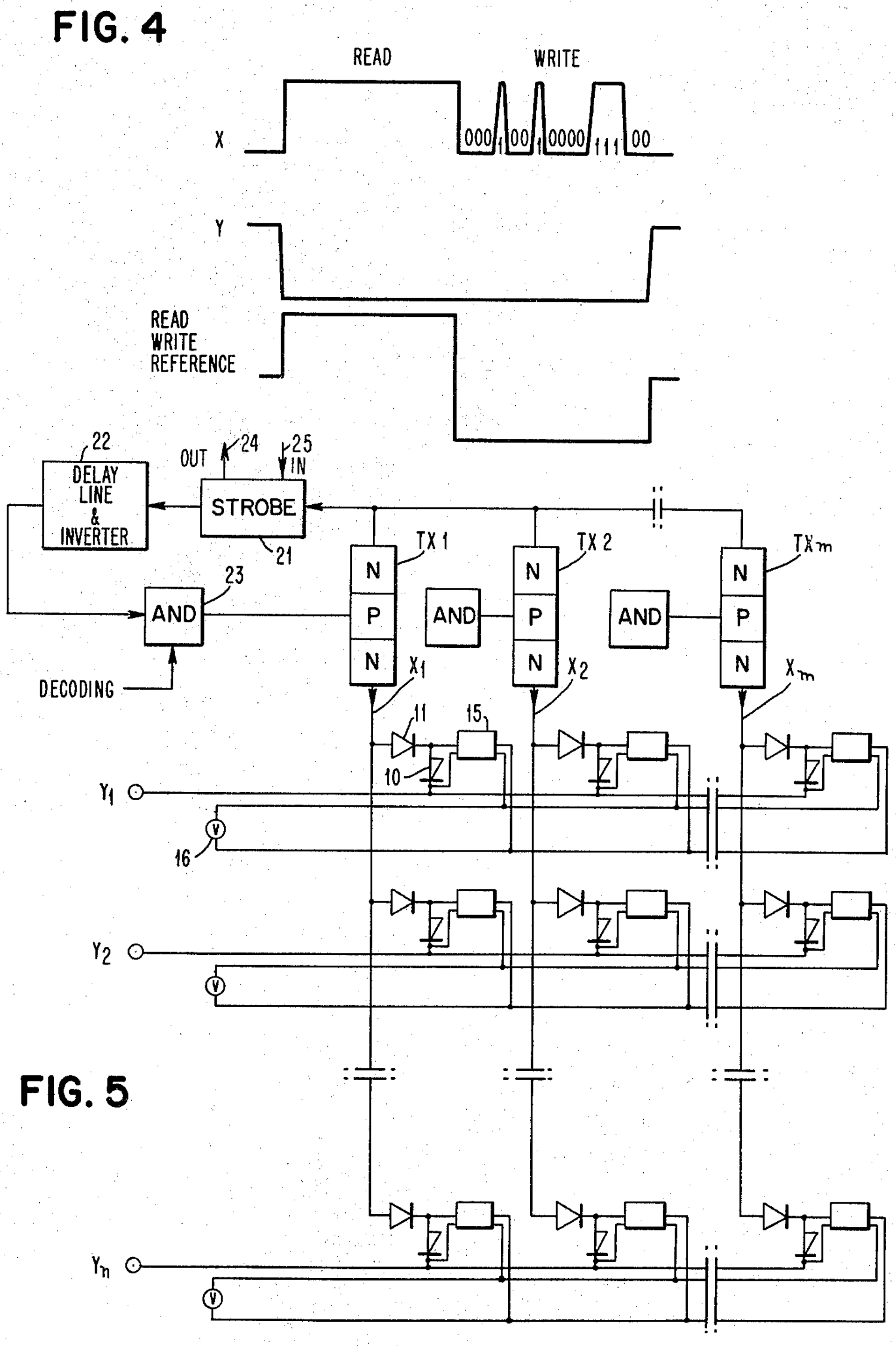
FIGURE 4 is a waveform diagram indicating the relationship of the X and Y driver signals for the circuit of FIGURE 1.
FIGURE 5 is a matrical arrangement of a number of circuits as shown in FIGURE 1 in a memory with appropriate driver and logical control circuitry.

External excitation is supplied at the terminals 12 and 13 by appropriate X and Y driver circuits (for example, conventional transistor emitter followers) in synchronism with a reference timing cycle for a read-write operation (refer to FIGURE 4). It is readily apparent from FIGURE 4 that the read and write portions of this timing cycle are equivalent and of a sufficient time duration to accommodate a plurality of bits of information. Ideally, the number of bits of information that can be stored by a particular circuit is limited only by the switching characteristics of the tunnel diode employed and the electrical response of the delay line 15. As a practical matter, however, this is limited to a smaller finite number and for purposes of illustration in this description, the number is chosen to be sixteen. Thus, in each half of the read-write timing cycle, there are sixteen bit positions for potential storage of information in the circuit. In order to accomplish this, the round-trip delay time of the delay line 15 is chosen to be equivalent to one-half of the read-write timing cycle. In addition, the bit rate clock is connected at the terminal 18 to operate at an integral multiple of this timing cycle with a magnitude of the order of several times the repetition rate of the read-write timing cycle. The bit rate clock maintains the pulsations in synchronism with the timing cycle for a read-write operation.

As already noted, the pulsations that are present in the circuit of FIGURE 1 are arbitrary excursions about a quiescent level. In order that these pulsations may be controlled and codified into information, they must first be read from the circuit. As shown in FIGURE 4 this is accomplished by applying a positive signal at the terminal 12 and a negative signal at the terminal 13. When this occurs, the conventional diode 11 is rendered conductive and the tunnel diode 10 is driven into its high impedance state, for example, the point B in the region III of its volt-ampere characteristic. As such, the tunnel diode is prevented from oscillating any further and the pulsations already produced are read from the circuit. Since the tunnel diode has a high impedance and the capacitor 17 presents a high impedance, substantially all the current flowing in the circuit passes through the conventional diode 11. The pulsations returning from the short circuited end of the delay line 15 appear in sequence at appropriate sensing circuitry associated with the driver circuit connected to the terminal 12. So long as the X and Y driver signals are maintained at positive and negative levels, respectively, the tunnel diode is prevented from oscillating and information cannot be written into the circuit.

In order to write information into the memory circuit in synchronism with the reference read-write timing cycle, the Y driver signal at terminal 13 is maintained at a negative level and the X driver signal at terminal 12 is returned to its original level and then periodically raised to a positive level. Each time that the X driver signal is raised to this positive level, the conventional diode 11 is rendered conductive permitting the information to be written into the circuit. This is accomplished by permitting the tunnel diode to fluctuate in level. Thus, if the information to be written into the circuit is codified, so that each time the tunnel diode is at a low level, it is indicative of a binary 0, and each time that the tunnel diode is at a high level, it is indicative of a binary 1, the illustrative sixteen bits of information may be written into the circuit by simply raising the level of the X driver signal each time that a binary 1 is written into the circuit. Where it is necessary to write sequentially a number of binary 1's into the circuit, then the X driver signal is simply maintained at its upper or more positive level. This aspect of operation is shown in the waveform diagram of FIGURE 4 wherein the sixteen bits of binary information written into the circuit in sequence during one write half cycle of a read-write timing cycle are as follows: 0001001000011100.

To terminate the write portion of the read-write timing cycle, both driver signals are returned to their normal level, i.e., the X driver signal is returned to its lower level and the Y driver signal is returned to its upper level. The information in the circuit continues to be stored as long as biasing of the tunnel diode is continued by the voltage source 16 connected to the delay line 15. The tunnel diode 10 continues to produce controlled pulsations or oscillations which will travel back and forth through the delay line. The application of the bit rate clock through the capacitor 17 acts to prevent the information from spreading out and to maintain the oscillations in synchronism with the read-write clock.

The memory circuit of FIGURE 1 may be employed as one storage cell of a matrical memory. As shown in FIGURE 4, a plurality of X and Y access lines are orthogonally disposed with respect to each other to form a two-dimensional memory matrix. A memory cell such as that shown in FIGURE 1 is connected at each crosspoint to an X access line and a Y access line. For example, if the cell located at the intersection of the X1 line and the Y1 line is considered, the conventional diode 11 of the memory circuit is directly connected to the X1 driver and the cathode of the tunnel diode 10 is directly connected to the Y1 driver (not shown). The delay line 15 is connected across the tunnel diode 10, and the D.C. voltage source 16 for biasing the tunnel diode 10 is connected to the delay line of each cell connected to a common Y access line. Thus, it is not necessary to supply individual biasing circuitry for each cell.

The X driver circuits may be transistors connected in emitter follower configuration for both read and write driving operations. They operate in response to appropriate pulses from the logic circuitry associated with the memory. During read out of the information the X driver transistors appear as transistors connected in common base configuration to the sensed information, so that the information from a particular cell appears at the collector electrode of its respective driver circuit. The Y driver circuits may take any form of bilevel voltage control source.

All of the X driver circuits have their collector electrodes ORed together and connected to a common regeneration loop. This regeneration loop comprises a strobe circuit 21 as part of the sensing circuitry for the memory, a delay line and inverter 22 and a circuit 23 and ANDing this regenerated information with a logic control signal for determining which of the X drivers is to be actuated for reading and writing information into a particular cell.

The sensing circuitry may include a series-to-parallel converter connected to the output line 24 of the strobe and operable under control of the reference read-write timing cycle clock, an output shift register for storing the information obtained from a particular cell and a utilizing circuit which may take any of a number of forms. The utilizing circuit may have its output connected through an input shift register and a parallel-to-series converter connected to the input line 25 of the strobe circuit and operable under the control of the reference read-write timing cycle clock.

Thus, when a particular Y driver circuit is actuated by bringing the Y selection signal down and a particular X line is actuated by raising the X selection signal, one of the cells may have information read from it. For example, if the X1 and Y1 access lines are actuated then the conventional diode 11 of the cell located at the intersection of these lines is rendered conducting and the tunnel diode 10 is driven into its high voltage state (point B on the volt-ampere characteristic of FIGURE 2). The information in the cell appears at the collector electrode of transistor Tx1 and is coupled in sequence to the strobe circuit 21. Thereafter, it is converted into a parallel form of information to be stored or otherwise utilized. This information or new information may be written into the cell by coupling it into the strobe circuit at 25 and through the delay line and inverter 22 which delays the information until the beginning of the write portion of the read-write cycle and returns it to its proper phase condition. Upon actuation of the AND circuit 23 by an appropriate logic signal from a decoder, the information is fed to the base of transistor Tx1 and dependent on whether the bit of information is a binary 1 or a binary 0, the level of the tunnel diode 10 is forced into the high voltage state or allowed to remain in the low voltage state (points B and A respectively of the curve of FIGURE 3) following the control of the delay line. Thus, the information is written into the cell in the manner described in conjunction with the description of FIGURE 1.

It is to be understood that the regeneration loop described above has been chosen merely by way of illustration. It is not essential for the operation of the memory circuits as the cells of a matrical memory, and other circuit arrangements may be employed to accomplish the same function. The particular regeneration loop described permits two cycles of operation to be performed, namely, read out of information and regeneration of the same information in the same cell, and secondly, destruction of the old information and writing of new information in the same cell. A third cycle comprising destructive read out of old information and writing of new information is possible with a more complex regeneration loop.

It is readily apparent that each of the memory cells actuated by only one selection pulse, either that supplied along an X access line or that supplied along a Y access line is not affected by the application of these signals. The operating condition of a tunnel diode of such a cell is not affected, since there is no change across a diode of the type provided by the bias source 16. The information contained in these cells continues to oscillate back and forth through the delay-line as the transmission media and under the control of the bit rate clock for that cell. These clocks have not been illustrated in the matrical showing of FIGURE 5, but it is apparent that they may be connected into each memory circuit in the manner shown in FIGURE 1.

Thus, it is obvious that a memory employing a circuit such as that of FIGURE 1, and arranged in a matrix, such as that of FIGURE 5, accomplishes the advantages heretofore mentioned. In particular, since each memory cell of an array is capable of storing more than one bit of information, the number of driver circuits required for control of an array storing a particular number of words is substantially reduced when compared with a conventional array. In addition, since each tunnel diode is employed in storing a plurality of bits of information, its cost may be averaged over the number of bits of information stored in that cell. An added advantage of the memory circuit and matrix of the invention permits them to be fabricated in an integrated manner on a common substrate. As such, the components of each circuit (with the exception of tunnel diode 10 and diode 11) may be of the printed circuit type.

While this invention has been particularly shown and described with reference to a preferred embodiment thereof, it will be understood by those skilled in the art that the foregoing and other changes in form and details may be made therein without departing from the spirit and scope of the invention.

For example, a D.C. voltage level often tends to build up on the delay lines of the cells of a matrix that are frequently selected. This problem may be alleviated by connecting a resistor in circuit with the delay line. Similarly, in the case of a small memery where a matrix is not employed, it is unnecessary to utilize all of the associated circuitry for each cell. In such circumstances, the Y driver may be eliminated from the circuitry and the tunnel diodes of the memory connected to a reference potential instead. The conventional diode may also be left out of the circuitry permitting the emitter-base diode of the X driver transistor to act as the diode of the cell.

What is claimed is:

1. A circuit for storing a plurality of bits of coded information manifested as the excursions of a signal from a quiescent level comprising
 a two terminal device having a negative resistance region bounded by positive resistance regions and normally biased in the negative resistance region for producing pulsations,
 first and second drive means connected respectively to the terminals of said device for providing read-write access to said circuit,
 said pulsations being coded into said excursions manifesting said information through said drive means,
 and delay means connected across said device for acting as the transmission media for said excursions during storage of said information.

2. A memory circuit, comprising
 a negative resistance device normally biased in its negative resistance region to produce plural discrete pulsations,
 drive means connected to said device for providing read-write control of the pulsations into information in said circuit, and
 delay means connected across said device for storing the plural discrete pulsations of said information.

3. The circuit of claim 2, wherein said drive means operate to provide read-write access to said circuit according to a predetermined time sequence and said circuit further comprises means operable at an integral multiple of said time sequence and in accordance with the number of said bits of information for maintaining said excursions in synchronism with said time sequence.

4. A memory cell, comprising
 a tunnel diode normally biased to produce a series of pulsations for codification as a plurality of bits of information,
 delay means connected across said tunnel diode for acting as the memory media for said pulsations,
 first drive means, including unidirectional conducting means, and second drive means for providing read-write access to said cell according to a predetermined time sequence, and
 synchronizing means in circuit with said diode and operable at an integral multiple of said time sequence for maintaining said pulsations in synchonism with said time sequence.

5. In a memory matrix, comprising
 $m$ number of X lines and $n$ number of Y lines intersecting to form $mn$ crosspoints,
 a negative resistance device coupled to the X and Y lines at the crosspoints,
 and short circuited delay means connected across the device at a crosspoint.

6. In a memory matrix, comprising
 $m$ number of X lines and $n$ number of Y lines intersecting to form $mn$ crosspoints,
 a negative resistance device coupled to the X and Y lines at the crosspoints,
 and delay means connected across the device at a crosspoint, 7. In a memory matrix having $m$ number of X lines and $n$ number of Y lines intersecting to form $mn$ crosspoints with a memory cell located at each crosspoint, each said cell being capable of storing a plurality of bits of information manifested as the excursions of a signal from a quiescent level, and comprising
 a two terminal device having a negative resistance region bounded by positive resistance regions,
 said device producing pulsations when normally biased about an unstable focus within said negative resistance region, first and second drive means respectively connecting the terminals of said device to the X and Y lines at that crosspoint for providing read-write access to said cell, said pulsations being coded into said excursions manifesting said information through said drive means, and delay means connected across said device and operable as the transmission media for said excursions during memory of said information.

8. In the matrix of claim 7, wherein a predetermined time cycle is maintained for read-write access to a particular cell, each said cell further comprising means operable at an integral multiple of said cycle and in accordance with the number of information bit positions in a cell for maintaining said excursions in synchronism with said cycle.

9. A memory matrix, comprising a plurality of storage cells, each including a two terminal negative resistance device normally biased about an unstable focus within its negative resistance region, a unidirectional conducting device connected to one terminal of said negative resistance device and delay means connected across said negative resistance device, first and second pluralities of access lines arranged in matrical manner to intersect forming a plurality of crosspoints for locating one of said cells at each crosspoint, first and second driver means coupled respectively to said first and second pluralities of access lines for supplying cell access signals to perform a read-write operation in a driven cell, means coupling each unidirectional conducting device of a cell to respective ones of said first plurality of lines, and means coupling each negative resistance device of a cell at the other terminal to respective ones of said second plurality of lines.

10. The memory matrix of claim 9, wherein said access signals are applied according to a predetermined time sequence, and each of said cells further comprises means in circuit with said negative resistance device and operable at a predetermined integral multiple of said time sequence and in accordance with the number of information bit positions in a cell for maintaining said information in synchronism with said time sequence.

References Cited by the Examiner

UNITED STATES PATENTS 3,119,985 1/64 Kaufman ____________ 340—173

FOREIGN PATENTS 1,151,281 7/63 Germany.

OTHER REFERENCES

Publication I: "The Tunnel Diode as a Storage Element," by Miller, 1960 Solid-State Circuits Conference, pages 52 and 53, February 1960.

Publication II: "A Tunnel Diode Tenth Microsecond Memory," by Kaufman, 1960 IRE International Convention Record, part 2, pages 114–123, March 1960.

IRVING L. SRAGOW, *Primary Examiner.*